United States Patent [19]

Cook et al.

[11] Patent Number: 4,826,287

[45] Date of Patent: May 2, 1989

[54] DISPLAY SYSTEM HAVING COMA-CONTROL PLATE IN RELAY LENS

[75] Inventors: Lacy G. Cook, El Segundo; Gerard M. Perron, Culver City; Brian K. Zellers, Hawthorne, all of Calif.; Brian D. Cohn, Garrett, Ind.

[73] Assignee: Hughes Aircraft Company, Los Angeles, Calif.

[21] Appl. No.: 5,416

[22] Filed: Jan. 20, 1987

[51] Int. Cl.$^4$ .................. G02B 27/10; G02B 13/18
[52] U.S. Cl. .................. 350/174; 350/447; 350/432
[58] Field of Search .............. 350/174, 447, 443, 444, 350/436, 432

[56] References Cited

U.S. PATENT DOCUMENTS

| | | | |
|---|---|---|---|
| 3,940,204 | 2/1976 | Withrington | 350/174 |
| 4,218,111 | 8/1980 | Withrington et al. | 350/436 |
| 4,407,564 | 10/1983 | Ellis | 350/174 |
| 4,410,241 | 10/1983 | de Lang et al. | 350/432 |
| 4,447,128 | 5/1984 | Ferrer | 350/174 |
| 4,669,810 | 6/1987 | Wood | 350/174 |

*Primary Examiner*—Jon W. Henry
*Attorney, Agent, or Firm*—Lewis B. Sternfels; A. W. Karambelas; W. J. Streeter

[57] ABSTRACT

A head-up display for use in a vehicle is provided with a curved combiner which reflects an image from a cathode ray tube (CRT) as collimated rays to a viewing site. A relay lens is positioned between the CRT and the combiner to magnify and transfer the image. The combiner may be a partially-reflecting mirror or holographic optical element or dielectric laminate. Included within the relay lens is a coma-control plate having two-dimensional undulations described mathematically by a two-dimensional power series having odd symmetry in a plane of a tilting of the combiner and even symmetry in the perpendicular dimension. The coma-control plate substantially reduces coma in an image presented for viewing at infinity, the coma being introduced by the curvature and off-axis use of a surface of the combiner.

10 Claims, 3 Drawing Sheets

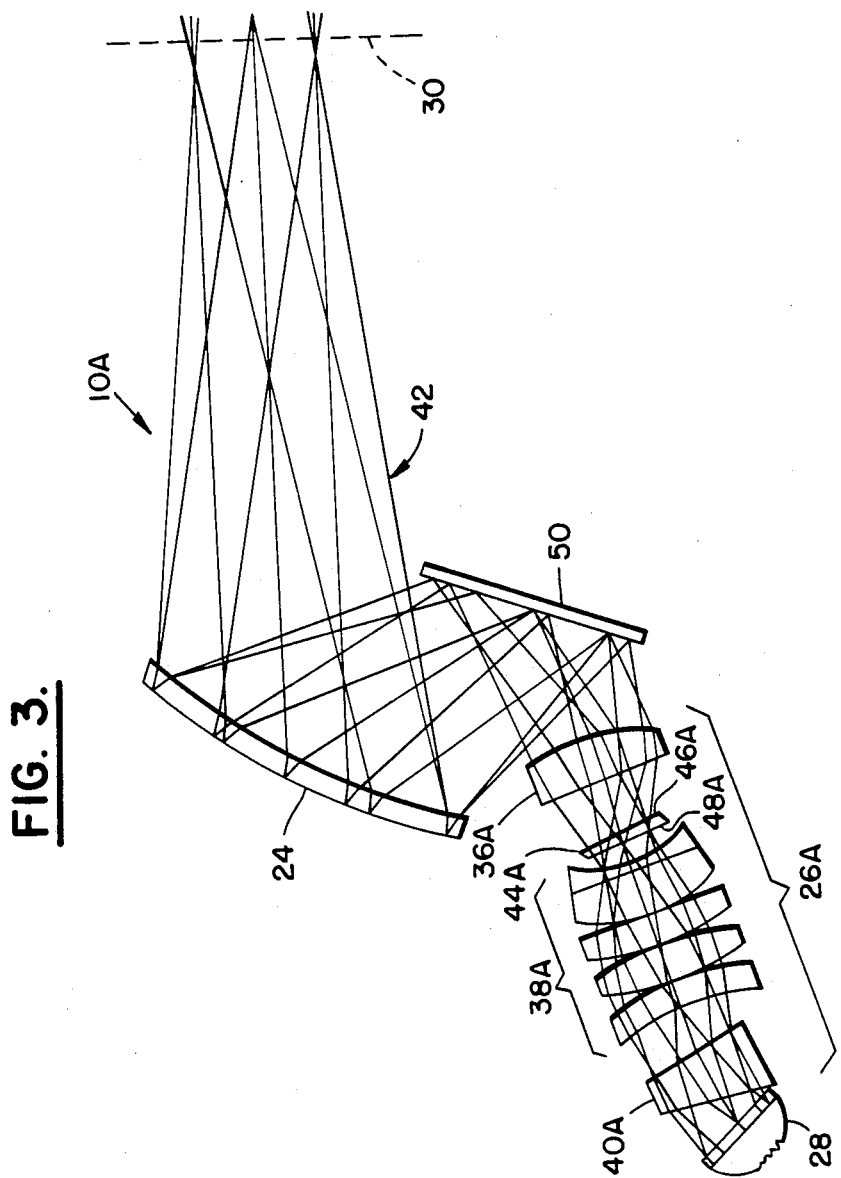

DISPLAY SYSTEM HAVING COMA-CONTROL PLATE IN RELAY LENS

BACKGROUND OF THE INVENTION

This invention relates to relay lenses for head-up optical displays suitable for use in vehicles such as aircraft and, more particularly, to a relay lens having a general aspheric plate with non-rotational symmetry for control of aberrations in images found in a head-up display having a curved reflecting combiner.

Head-up displays have a combiner which is at least semitransparent, and is formed of a curved semireflecting plate, or holographic optical element by which an image can be presented superposed upon a scene external to the aircraft, such external scene being of the "real world" as viewed through a window of the aircraft. The combiner presents both the image and the external scene simultaneously to a viewer or operator of a vehicle, the combiner permitting the viewer to see straight ahead to be able to pilot a vehicle. Typically, the display equipment includes a generator of the image, such as a cathode ray tube (CTR) plus a relay lens which focuses and directs optical rays from the CRT to the combiner for presentation to the viewer.

A problem arises in that the curvature and off-axis characteristic of the combiner affects the optical characteristics of an image by introducing aberration, primarily coma, in the image presented to the viewer. Attempts have been made to compensate for the aberration by the inclusion of tilted and decentered elements in the relay lens. However, these attempts have been disadvantageous in that the resulting compensation still allowed the presence of excessive image aberration. Furthermore, the compensation was obtained at a cost of complexity, difficulty of mounting the lens elements, and difficulty of alignment.

SUMMARY OF THE INVENTION

The aforementioned problem is overcome and other advantages are provided by a relay lens incorporating a coma-control plate to reduce the presence of two-dimensional aberration. In accordance with the invention, the plate has a planar surface with an opposed surface having two-dimensional undulations described by a two-dimensional power series, such as a power series employing Zernike terms.

In accordance with a feature of the invention, the coma-control plate is located within the relay lens at a reimaged location of the display's exit pupil. This construction of the relay lens can be accomplished essentially without enlargement of the physical size of the relay lens.

BRIEF DESCRIPTION OF THE DRAWING

The aforementioned aspects and other features of the invention are explained in the following description, taken in connection with the accompanying drawing wherein:

FIG. 3 is a further embodiment of the optical arrangement of FIG. 2 by the inclusion of a folding mirror.

DETAILED DESCRIPTION

Figure 1:
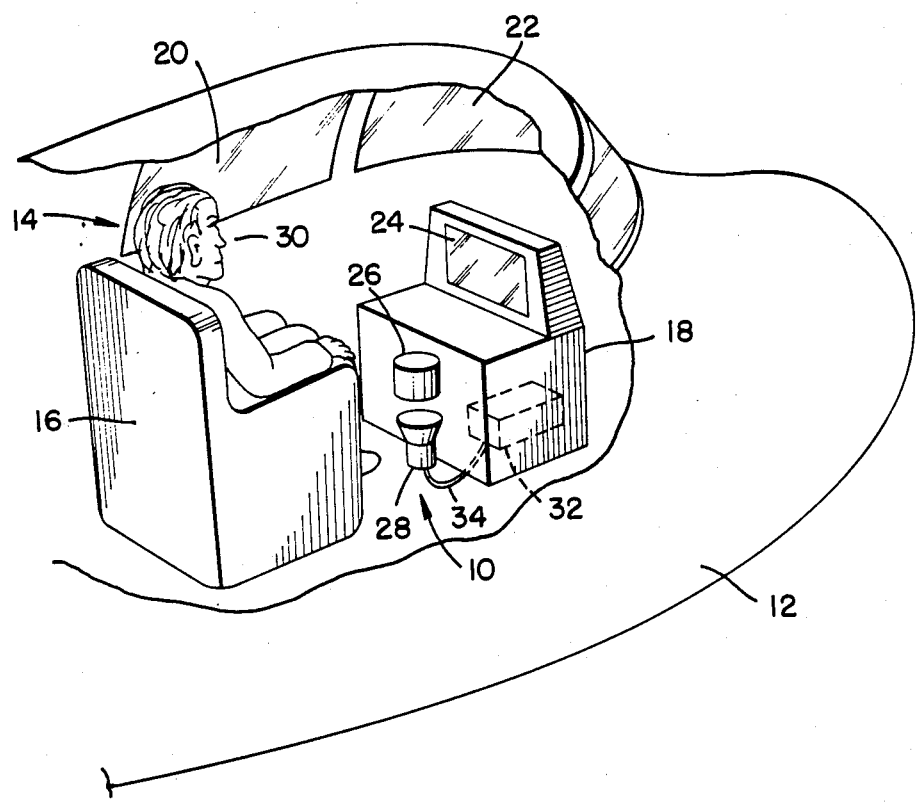
FIG. 1 is a simplified stylized view of an aircraft cockpit carrying a head-up display of the invention.

FIG. 1 shows a head-up display system 10 mounted within a vehicle which, by way of example, is shown as an aircraft 12. The aircraft 12 carries a pilot 14 seated within a seat 16 in front of a console 18. Only a portion of the aircraft 12 is shown for demonstrating implementation of the system 10. Included within FIG. 1 is a window 20 on the side of the aircraft 12 and a window 22 in the front of the aircraft 12, the windows 20 and 22 allowing the pilot 14 to view outside the aircraft 12.

The system 10 includes a combiner 24, a relay lens 26 and a cathode ray tube (CRT) 28. The combiner 24 is mounted on the console 18 by brackets (not shown) and positioned between the window 22 and the pilot 14. The relay lens 26 and the CRT 28 are also secured by brackets (not shown) to the console 18. The lens 26 and the combiner 24 serve to collimate rays of an image on the CRT 28 through a plane at the face 30 of the pilot 14. The collimated rays provided by the combiner 24 allow the pilot to focus on the CRT image as though the image were located at infinity. Thereby, the lenses in the pilot's eyes are set to view, via the window 22, an external scene located at infinity and, simultaneously, to view the CRT image which also appears at infinity. The image presented by the CRT 28 is generated with the aid of an electronics unit 32, shown in phantom within the console 18, the unit 32 being connected via an electrical cable 34 to the CRT 28.

The combiner 24 is formed as a partially reflecting mirror or holographic optical element for presenting the image of the CRT 28 while being substantially transparent to radiation propagating through the window 22 to the pilot 14. Thereby, the pilot 14 can view a scene (not shown) external to the aircraft directly through the combiner 24 and the window 22. Such viewing of the external scene by the pilot 14 can be done concurrently with a viewing of an image presented by the CRT 28.

Figure 2:
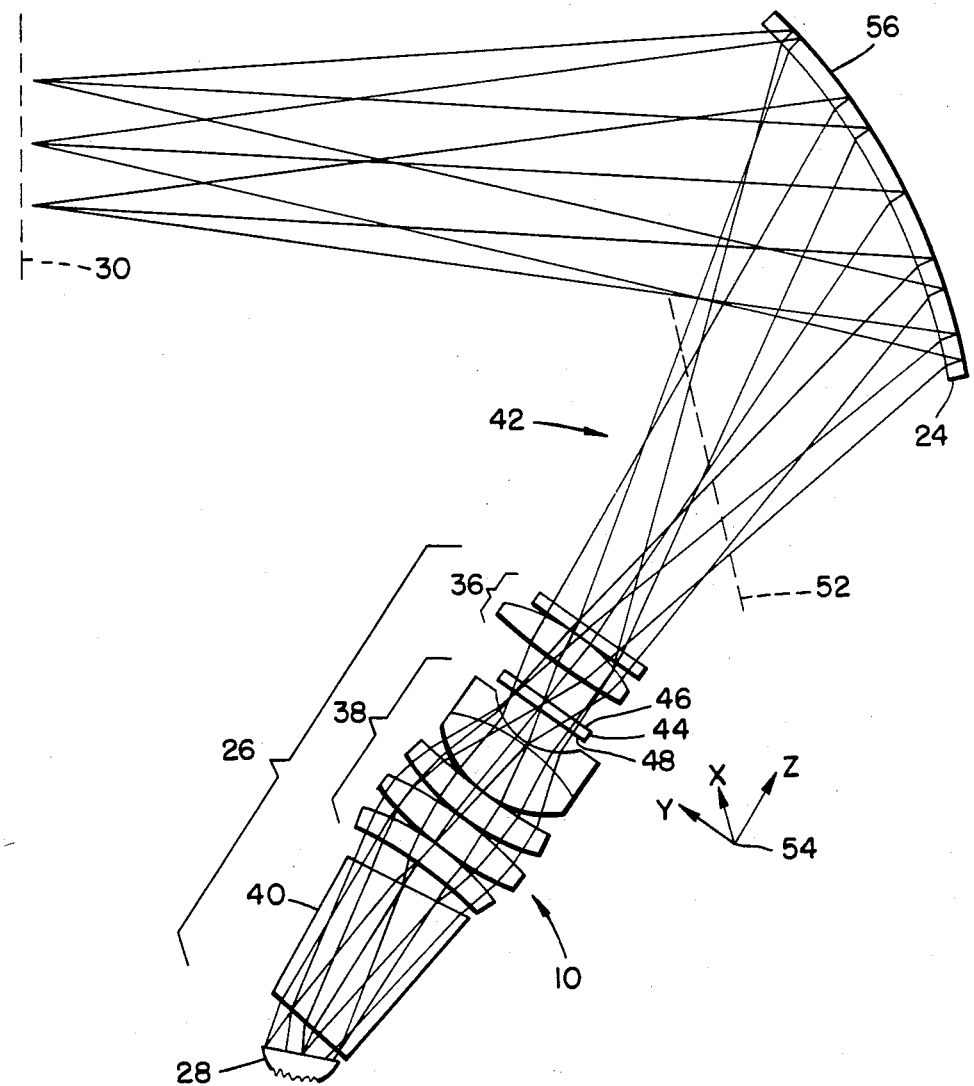
FIG. 2 is an enlarged view of an optical portion of the system of FIG. 1, shown diagrammatically.

FIG. 2 shows, in diagrammatic form, an enlargement of the system 10. The face 30 of the pilot 14 is shown by a dashed line 30 indicating a plane or pupil of collimated rays from the image displayed by the CRT 28, only the front portion of the CRT 28 being shown in FIG. 2. The relay lens 26 comprises a small lens group 36, a large lens group 38, and a prism or optical wedge 40. The optical wedge 40 faces the CRT 28, and the small lens group 36 faces the combiner 24. Rays 42 of light are shown propagating from the CRT 28 via the relay lens 26 to the combiner 24 from which the rays 42 are directed to the pilot's face 30. The combiner 24 is provided with a slight curvature to facilitate a collimating of the CRT presentation at the plane of the pilot's face 30. In a preferred embodiment of the invention, the combiner 24 is curved in two dimensions, the curvature being about an X axis, perpendicular to the plane of the sheet of drawing containing FIG. 2, and about a Y axis which is parallel to the plane of the drawing. The combiner 24 is advantageously provided with a spherical surface. The combiner 24 is tilted about the X axis relative to a line of sight from the pilot's face 30 in accordance with the location of the relay lens 26 so as to direct rays from the CRT 28 to the pilot. Aberrations introduced by reflection of the rays 42 from the combiner 24 are primarily in the nature of coma.

In accordance with the invention, the system 10 includes a coma-control plate 44 inserted within the relay lens 26 between the small lens group 36 and the large lens group 38. The plate 44 has a front surface 46 which is curved in two dimensions, and a back surface 48 which is flat. By virtue of the curvature of the front surface 46, the plate 44 compensates for abberations in the displayed image introduced by curvature and off-axis use of the combiner 24.

FIG. 3 shows a head-up display system 10A which is an alternative embodiment of the system 10 of FIG. 2, the embodiment of FIG. 3 being accomplished by the inclusion of a planar folding mirror 50 in the system 10A to fold the paths of the rays 42. The location of the fold is indicated by a dashed line 52 in FIG. 2. The system 10A of FIG. 3 includes a relay lens 26A comprising a small lens group 36A, a large lens group 38A, an optical wedge 40A and a coma-control plate 44A having a front surface 46A and a back surface 48A. Optical elements of the lens group 38A are located about a common axis. The plate 44A is of substantially the same form as the plate 44, and includes a front surface 46A which is curved in two dimensions, and a back surface 48A which is flat.

Either of the embodiments of FIGS. 2 and 3 may be used for construction of the invention, the choice of the embodiment depending on the physical constraints of the environment in which the invention is to be situated. By way of example, in the case of the aircraft 12 of FIG. 1, if there is space for mounting the CRT 28 in a vertical position in front of the console 18, as shown, then the embodiment of FIG. 2 is readily installed. In contrast, in the event that the CRT 28 is to be mounted within the console 18, then the embodiment of FIG. 3 is to be installed. The path of propagation of rays of radiation from the CRT 28 to the pilot's face 30 may be regarded as being composed of two legs, the first leg extending from the CRT 28 to the combiner 24 (FIG. 2) and the second leg extending from the combiner 24 to the pilot's face 30. The first leg may be folded by the mirror 50 in FIG. 3. While the focal lengths and other characteristics of the lens elements of the two embodiments are to be established in accordance with the geometry of the installation, both embodiments operate in the same fashion as will now be described.

The invention provides a highly precise image in the head-up display systems 10 and 10A by use of the coma-control plates 44 and 44A, respectively, which plates have a nonrotationally but bilaterally symmetric, coma-effecting, aspheric configuration on the respective front surfaces 46 and 46A. To facilitate the ensuing description, reference will be made only to the system 10 and the plate 44 of the lens 26, it being understood that the description applies equally well to the system 10A incorporating the plate 44A in the lens 26A.

The plate 44 is situated at the pupil location in the relay lens 26, and introduces the beneficial effect of reducing or eliminating tilting and decentering of individual elements of the lens 26, which tilting and decentering has been required heretofore to compensate for image aberration introduced by the curvature and off-axis use of the combiner 24. The introduction of the plate 44 is compatible with the combiner of a head-up display introducing coma, with or without astigmatism, across the field of view to compensate for the coma and to present the image with a high level of precision.

In the design of a head-up display, first-order properties of the combiner 24 relating to eye relief, focal length, off-axis angle, and similar considerations, are generally dictated by the dimensions of the aircraft cockpit. Within these constraints, one may choose to perform a preliminary optimization of the image quality by, for example, correcting a series of differential rays at the combiner output pupil. This is accomplished by use of a computer and any one of a number of available optical ray-tracing programs by which the performance of the optical system can be determined.

In the designing of the optical system with the aid of a computer ray-tracing program, differential rays may be presented showing inclination of aberrated rays about a chief ray which is properly focused. By altering parameters of the optical system, the position and orientation of these rays can be uniformly positioned about the field of view to reduce focusing errors to residual values of less than one milliradian throughout the field of view. As a practical matter, the focusing errors may be regarded as being eliminated. In terms of use of the ray-tracing program, if the combiner 24 is a mirror, the above process involves the establishment of a local surface normal at all points of the combiner; if the combiner is a holographic optical element, the foregoing process involves the establishment of a local grating vector. Such design techniques are commonly employed in optical design and need not be elaborated herein.

The dominant aberration remaining after elimination of focal errors by the above process is coma. Depending on the first-order properties of the optical system, the magnitude of the coma may be in the region of 15 to 30 milliradians. The extent of the coma is substantially constant across the field of view. This ensures proper operation of the combiner with the relay lens in the optical system of the invention.

The plate 44 is located within the relay lens 26 at a site which may be characterized as a reimage site of a pupil located at the pilot's face 30. The reimage site is found by considering a pair of intersecting rays at the face 30, following these rays past the combiner 24 and through the small lens group 36 to the location at which these two rays again intersect. This is the site of the reimaged pupil, and the site at which the plate 44 is to be located. The location and construction of the plate 44 is the same for both mirror and holographic manifestations of the combiner 24. It is noted that the use of a semitransparent mirror for the combiner 24 allows approximately 50% transmission of light from scenes external to the aircraft to the pilot 14 while, in the case of the holographic implementation of the combiner 24, the foregoing transmissivity is increased to approximately 95% percent. Similarly, for rays emanating from the CRT 28, the semitransparent mirror for the combiner 24 will reflect approximately 50% of the light to the pilot 14, while in the case of the holographic implementation of the combiner 24, the foregoing reflectance can be increased to approximately 90%.

With respect to the emplacement of the plate 44 at the site of the reimaged pupil, it is advantageous to align the plate at the same orientation as the pupil image so that the aspheric front surface 46 can control the coma uniformly at all points in the field of view. It is also noted that, if desired, the aspheric and the planar surfaces of the plate 44 may be interchanged such that the aspheric surface is at the back side of the plate and the planar surfaces at the front side of the plate. However, in the preferred embodiment of the invention, the front surface 46 is provided with the undulations of the aspheric surface while the back surface 48 is planar. While it is possible to construct both of the surfaces 46 and 48 with undulations, adequate control of coma and facility of construction are attained in the preferred embodiment by leaving one of the surfaces planar.

The aspheric properties of the front surface 46 are implemented by forming two dimensional undulations within the front surface 46 by use of well-known lens-forming equipment, such as a diamond stylus which grinds the lens surface under automatic position control in two dimensions.

The surface 46 of the plate 44 may be described with reference to a set of coordinate axes 54. The Z axis is perpendicular to the planar surface 48 of the plate 44. The X and the Y axes are parallel to the planar surface 48, the Y axis, as noted above, being parallel to the sheet of drawing and the X axis, as noted above, being perpendicular to the sheet of drawing of FIG. 2. The front surface 46 is provided with undulations described by the following equation $$Z = K_1 Y(X^2 + Y^2) + K_2 Y(X^2 + Y^2)^2$$

wherein Z is the amplitude of an undulation as measured from a reference plane passing through the origin of the set of coordinate axes 54. $K_1$ and $K_2$ are constants, the values of which are to be selected by an optical ray-tracing program. This equation may be characterized as a power series containing Zernike terms of various orders. Additional terms can be included to compensate for other optical aberrations to provide for a further optimization of the image presented to the pilot. However, even with the use of such additional terms (not shown), the dominant effect of the aspheric plate 44 will be the control of coma.

In the formation of the combiner 24 as a semireflecting mirror, the combiner 24 is fabricated of glass with a thin layer of silver or aluminum or several thin layers of dielectric material deposited on the convex back surface at 56. In the case of construction of the combiner 24 with a holographic optical element, the holographic optical element is constructed as a gel deposited along the concave back surface at 56. A glass cover layer (not shown) may be placed over the back surface of the gel to protect the gel. In such case, the combiner 24 is formed as a laminate comprising a front layer of glass having a thickness of approximately ¼ inch, a layer of dichromated gelatin having a thickness of approximately 12 microns, and a back layer of glass which is approximately ⅛ inch thick. The gelatin serves as a recording medium for recording an interference pattern of two beams of light emanating from two coherent point sources, which recorded interference pattern is formed during the construction of the combiner 24 and provides the requisite diffraction characteristics for collimating the rays of light from the CRT display. It is noted that the holographic optical element is sensitive to wavelength of the light, the optical characteristics being selected to diffract the monochrome color of the CRT display, while allowing light of other colors to pass through the combiner 24 unimpeded. By way of yet a further embodiment, the gelatin may be replaced with a dielectric material for construction of the combiner as a dielectric laminate.

It is noted that, in the equation, the expression has even symmetry with respect to the variable X, but odd symmetry with respect to the variable Y. This is due to the fact that tilting of the combiner 24 is about the X axis only, there being no tilting about the Y axis,. As a result, the coma control is accomplished by odd symmetry in the Y component of the surface 46 while even symmetry is found in the X component of the surface 46. In the construction of the plate 44, the thickness thereof is approximately 0.15 inches. The plate is constructed of glass having a commonly available refractive index such as 1.52 or 1.79, by way of example. The values of the constants $K_1$ and $K_2$ are dependent also on the values of the index of refraction as is well known in the utilization of an optical raytracing program for computer-aided design of optical systems.

The invention is useful with relay lenses of various configurations. By way of example, as shown in FIG. 2, the large lens group 38 is composed of five elements comprising three singlets and one doublet that share a common optical axis. The small lens group 36 has two elements in FIG. 2 and one element in FIG. 3. The optical wedge 40 aids in orienting the plane of the face of CRT 28. The physical shape of the wedge 40 differs from the shape of the wedge 40A so as to provide for the desired bending of rays to orient the image with the face of the CRT 28 in the respective configurations of the optical systems of FIG. 2 and FIG. 3.

Implementation of the invention simplifies construction of a relay lens while retaining flexibilty on the design of a head-up display so as to allow installation of the display subject to constraints of various physical considerations such as the limited confines of an aircraft cockpit.

It is to be understood that the above described embodiments of the invention are illustrative only, and that modifications thereof may occur to those skilled in the art. Accordingly, this invention is not to be regarded as limited to the embodiment disclosed herein, but is to be limited only as defined by the appended claims.

What is claimed is:

1. A display system including a relay lens and a combiner, and wherein imaging rays propagating through the relay lens are reflected from a curved surface of the combiner, the relay lens comprising:

a first lens group having at least one optical element and a second lens group having at least one optical element, each of said lens groups being disposed along a direction of propagation of rays of radiation carrying image data to be presented as collimated rays at a viewing site by said system, said rays of radiation propagating along a path comprising a first leg and a second leg wherein said first leg extends through said relay lens, and wherein radiation propagates along said first leg to reflect off said curved surface of said combiner via said second leg to reach said viewing site, there being a reimaging location on said first leg alongside an element of said relay lens for reimaging a pupil of collimated rays situate on said second leg at said viewing site; and a coma-control plate disposed on said first leg at said reimaging location for removing aberration introduced by said curved surface of said combiner, said plate having first and second opposed surfaces, at least one of said opposed surfaces being configured with undulations described mathematically by a power series in two orthogonal dimensions.

2. A relay display system according to claim 1 wherein the surface of said combiner is spherical and is tilted in one plane about an axis perpendicular to said plane, and wherein the undulations of said first surface of said plate have even symmetry in a dimension parallel to the axis of tilting of said combiner, the undulations having odd symmetry in a dimension perpendicular to said axis of tilting.

3. A relay display system according to claim 2 wherein the undulations of the first surface of said plate are described mathematically by $$Z = K_1 Y(X^2 + Y^2) + K_2 Y(X^2 + Y^2)^2$$

wherein X is a dimension parallel to said axis of tilt of said combiner and Y is a dimension perpendicular to the X dimension, and wherein $K_1$ and $K_2$ are constants, Z being the amplitude of undulation.

4. A relay display system according to claim 3 wherein said reimaging location is situated between said first lens group and said second lens group.

5. A display system wherein imaging rays are transmitted from an image source to a viewing site by redirection from a curved surface of a combiner, the system comprising:
an image source;
a combiner having a curved surface for collimating the rays at the viewing site; and
a relay lens including a first lens group having at least one optical element and a second lens group having at least one optical element, each of said lens groups being disposed along a direction of propagation of rays of radiation carrying image data to be displayed at a viewing site by said system, said rays of radiation propagating along a path comprising a first leg and a second leg wherein said first leg extends through said relay lens, and radiation propagates along said first leg to reflect off said curved surface of said combiner via said second leg to reach said viewing site, there being a reimaging location between said first lens group and said second lens group for reimaging a pupil of rays of said second leg at said viewing site; and wherein
a coma-control plate disposed on said first leg at said reimaging location for controlling coma introduced by said curved surface of said combiner, said plate having first and second opposed surfaces, said first surface being configured with undulations described mathematically by a power series in two orthogonal dimensions, said second surface being planar.

6. A display system according to claim 5 wherein said combiner comprises a half-silvered mirror.

7. A display system according to claim 5 wherein said combiner comprises a dielectric coating laminate.

8. A display system according to claim 5 wherein said combiner comprises a holographic optical element.

9. A display system according to claim 5 further comprising a folding mirror disposed between said relay lens and said combiner, said first leg of said propagation path being folded about said folding mirror to provide a predetermined overall configuration to said system.

10. A display system according to claim 9 wherein said system is a head-up display, and said image source is a cathode ray tube, said relay lens further comprising an optical wedge for orienting an image produced by said image source to be in alignment with a plane of said viewing site.

* * * * *

UNITED STATES PATENT AND TRADEMARK OFFICE
CERTIFICATE OF CORRECTION

PATENT NO. : 4,826,287

DATED : May 2, 1989

INVENTOR(S) : LACY G. COOK, GERARD M. PERRON, BRIAN K. ZELLERS, and BRIAN D. COHN It is certified that error appears in the above-identified patent and that said Letters Patent is hereby corrected as shown below:

Claim 2, Column 6, line 63, delete --relay--.

Claim 3, Column 7, line 3, delete --relay--.

Claim 4, Column 7, line 13, delete --relay--.

Signed and Sealed this

Seventeenth Day of March, 1992

Attest:

HARRY F. MANBECK, JR.

*Attesting Officer*           *Commissioner of Patents and Trademarks*